(12) United States Patent
Morisawa

(10) Patent No.: US 7,188,264 B2
(45) Date of Patent: Mar. 6, 2007

(54) POWER MANAGEMENT SYSTEM

(75) Inventor: Toshikazu Morisawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 10/718,212

(22) Filed: Nov. 20, 2003

(65) Prior Publication Data

US 2004/0103329 A1 May 27, 2004

(30) Foreign Application Priority Data

Nov. 26, 2002 (JP) .................... 2002-342629

(51) Int. Cl.
- G06F 1/00 (2006.01)
- G06F 1/26 (2006.01)
- G06F 1/32 (2006.01)
- G06F 11/30 (2006.01)

(52) U.S. Cl. .................... 713/300; 713/320; 713/340
(58) Field of Classification Search ................ 713/300, 713/320, 330, 340
See application file for complete search history.

(56) References Cited

U.S. PATENT DOCUMENTS

| | | | |
|---|---|---|---|
| 5,689,172 A * | 11/1997 | Koyama et al. | 320/125 |
| 6,177,779 B1 * | 1/2001 | Eguchi | 320/116 |
| 6,580,460 B1 * | 6/2003 | Takahashi et al. | 348/372 |
| 6,691,248 B1 * | 2/2004 | Nishijima et al. | 714/14 |
| 6,728,812 B1 * | 4/2004 | Kato | 710/303 |
| 6,880,093 B1 * | 4/2005 | Lyles | 713/300 |
| 6,950,732 B2 * | 9/2005 | Lumbis et al. | 701/20 |
| 7,119,458 B2 * | 10/2006 | Barnes et al. | 307/65 |
| 2003/0139207 A1 * | 7/2003 | Yamazaki | 455/573 |
| 2004/0158541 A1 * | 8/2004 | Notarianni et al. | 705/412 |
| 2004/0243861 A1 * | 12/2004 | Sakai | 713/300 |
| 2005/0204176 A1 * | 9/2005 | Togawa | 713/320 |

FOREIGN PATENT DOCUMENTS

| | | |
|---|---|---|
| EP | 1 071 185 A | 1/2001 |
| EP | 1 156 573 A | 11/2001 |
| JP | 4-370858 | 12/1992 |
| JP | 9-179604 | 7/1997 |
| JP | 2000-29576 | 1/2000 |
| JP | 2000-29576 A | 1/2000 |
| JP | 2001-327074 A | 11/2001 |
| JP | 2002-176729 | 6/2002 |
| JP | 2002-271992 | 9/2002 |
| JP | 2002-271992 A | 9/2002 |
| WO | 88/04494 A | 6/1988 |

* cited by examiner

Primary Examiner—Rehana Perveen
Assistant Examiner—Michael J. Brown
(74) Attorney, Agent, or Firm—Foley & Lardner LLP

(57) ABSTRACT

An electronic device receives information associated with power supply control transmitted from a server and controls a selection of power sources from among an AC power source and a secondary power supply such as a battery on the basis of the received information associated with power supply control.

4 Claims, 9 Drawing Sheets

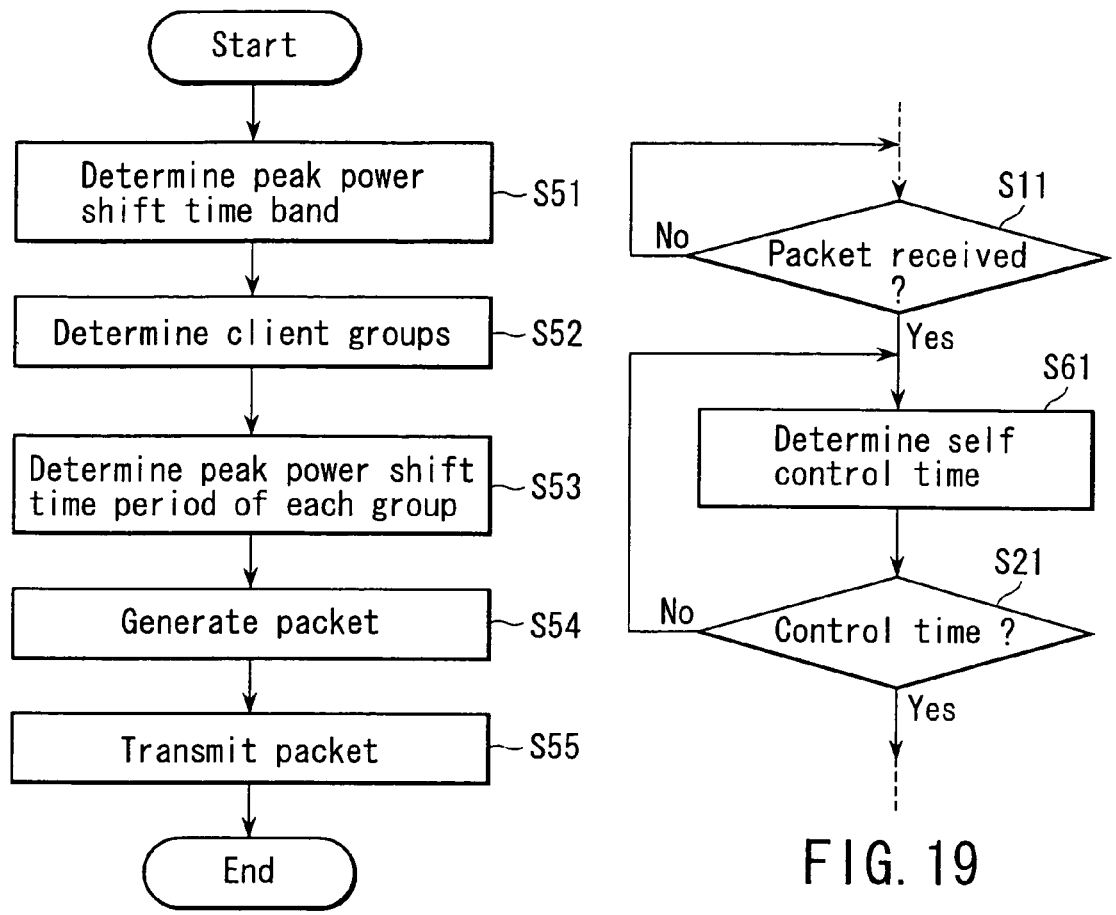
FIG. 18
FIG. 19
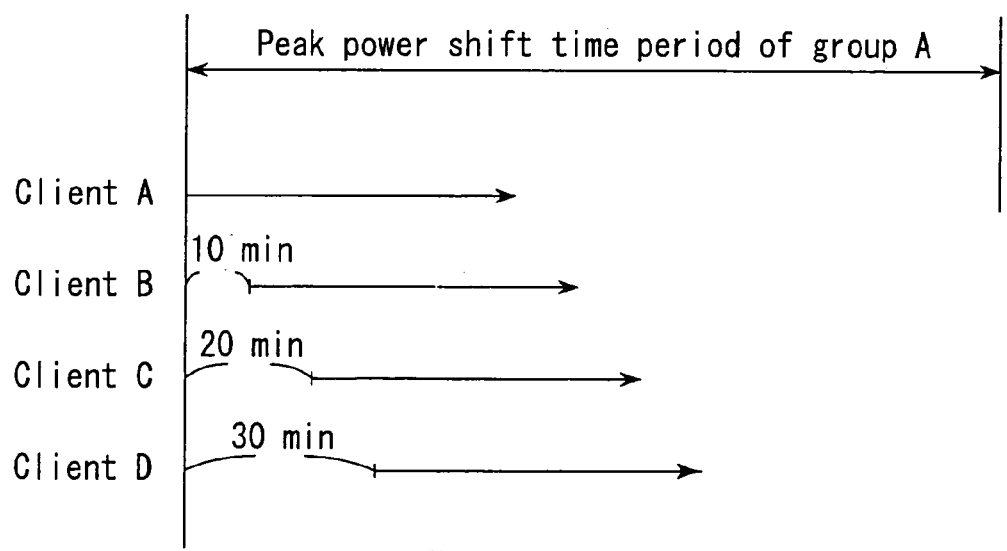
FIG. 20

POWER MANAGEMENT SYSTEM

CROSS-REFERENCE TO RELATED APPLICATIONS

This application is based upon and claims the benefit of priority from the prior Japanese Patent Application No. 2002-342629, filed Nov. 26, 2002, the entire contents of which are incorporated herein by reference.

BACKGROUND OF THE INVENTION

1. Field of the Invention

The present invention relates to a power management system and, more particularly, to a power management system which manages the power consumption of client computers in a corporation.

2. Description of the Related Art

The power demand varies depending on factors such as the season, weather, and the like, and a power company must come up with power equipment that can cope with the peak power demand. Therefore, when the power load varies abruptly, the power efficiency in a power plant deteriorates.

To solve such problems, a technique for demanding power savings from the power company to commercial-scale utility customers, and leveling the load variation of the power demand is known. As an example of such technique, an electronic device is known which attains a peak power shift of a commercial power supply in such a manner that it receives electric power from a battery supply in place of an AC adapter, and without charging the battery supply, in a time band designated by the user.

Also, the following technique is available. That is, if a given corporation reduces power consumption the request of a power company, the power company pays an incentive fee corresponding to the reduction power. For example, a corporation decreases consumption power in a time band corresponding to a peak power demand such as an afternoon in midsummer, and reduces the cost to the whole corporation (Jpn. Pat. Appln. KOKAI Publication No. 2002-176729).

However, in the technique for saving electricity in a time band designated by the user, since power consumption of a commercial AC power supply is reduced in a given time band and battery charging is done in another time band irrespective of the actual power supply-demand relationship, a peak shift that reflects actual power supply cannot be attained. For example, when a given device is set to be driven by a battery in a predetermined time band in an afternoon in summer, even when the power supply-demand relationship is relaxed owing, for example, to rain or unseasonable weather, an unnecessary peak shift is still automatically made.

With this technique, since a plurality of users simultaneously reduce power consumption, the power supply-demand balance changes abruptly, and such change adversely influences safety reliability of the power management system. As another problem, the battery-driven time is limited.

Especially, when it is planned to manage a peak power shift without making users realize it, most of the charged battery is used during the peak power shift period. Hence, when a long peak shift operation time band is adopted, the peak shift function works in the former half of that time band, but the peak shift effect is considerably reduced in the latter half of the time band.

In the technique disclosed in Jpn. Pat. Appln. KOKAI Publication No. 2002-176729, the fundamental advantage of using electricity is offset as a result of power savings. For example, the above technique is subjected to the disadvantage that the air conditioning temperature of a building is set higher than what is generally considered comfortable.

BRIEF SUMMARY OF THE INVENTION

According to an embodiment of the present invention, an electronic apparatus is provided which has a receiver configured to receive information from an external device, a battery, and a controller configured to control supplying power from the battery on the basis of information, received from the external device via a communication device, indicating the electronic apparatus is being supplied power from the battery.

According to the embodiment of the present invention, a server communicates with a computer and a power company and has a device for receiving power load information transmitted from the power company, a device for determining information indicating that the computer is to be supplied power from the computer internal or external battery on the basis of the received power load information, and a device for transmitting the determined information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

FIG. 18 is a flow chart for explaining the operation of a power user corporation management server in the power management system according to the third embodiment of the present invention;

FIG. 19 is a flow chart for explaining a client process;

FIG. 20 is a chart for explaining the power supply control timings of client computers included in a single group;

DETAILED DESCRIPTION OF THE INVENTION

A power management system according to preferred embodiments of the present invention will be described hereinafter with reference to the accompanying drawings.

<First Embodiment>

Figure 1:
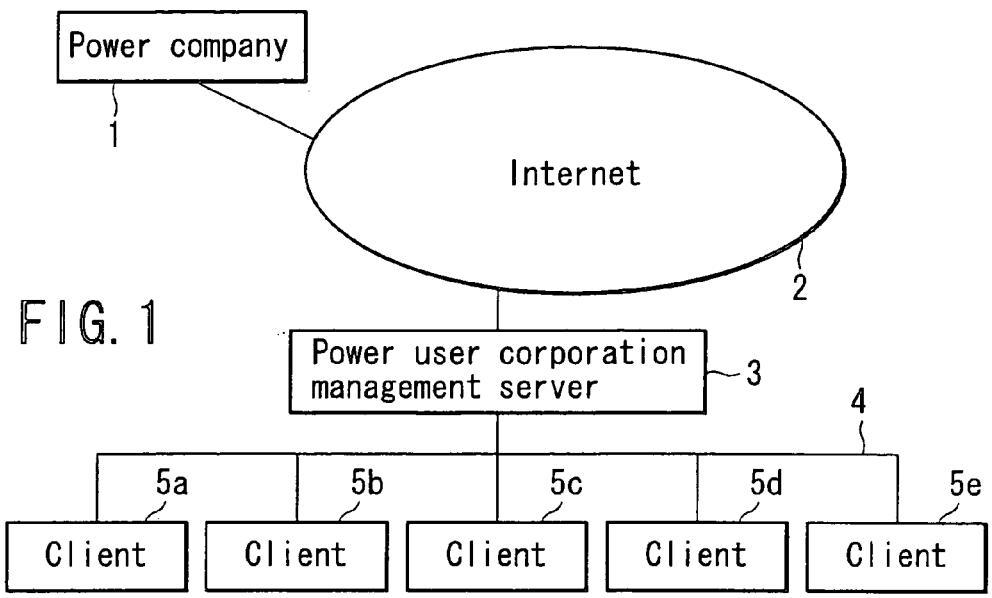
FIG. 1 is a block diagram showing a power management system according to the first embodiment of the present invention.

FIG. 1 is a block diagram showing a power management system according to the first embodiment of the present invention.

Referring to FIG. 1, a power company 1 and power user corporation management server 3 are connected via the Internet 2. The power user corporation management server 3 is connected to a LAN 4, to which client computers 5a to 5e that are to undergo peak shift power control are connected. Each of these client computers 5a to 5e has a battery (rechargeable secondary battery) which is used when is used when the computer is mobile and is not plugged into an AC source. Each computer is also designed to operate by power supplied via an AC adapter.

Figure 2:
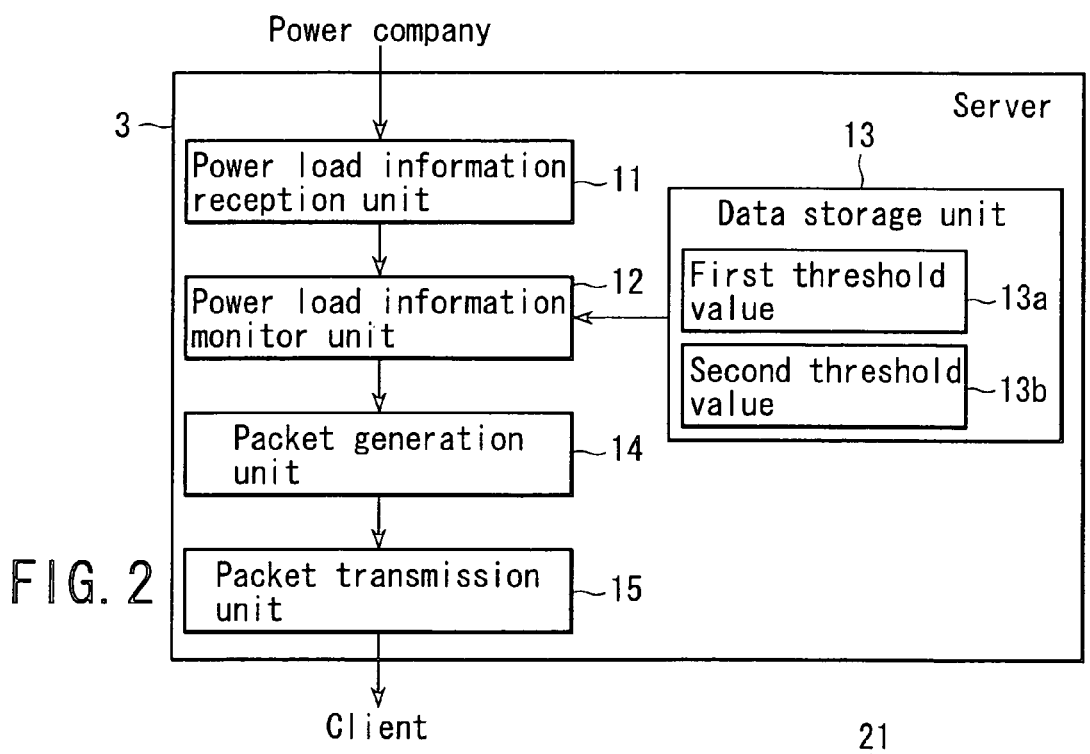
FIG. 2 is a block diagram showing the arrangement of a power user corporation management server according to the first embodiment of the present invention.

FIG. 2 is a block diagram showing the arrangement of the power user corporation management server 3 according to the first embodiment of the present invention.

As shown in FIG. 2, the server 3 according to the first embodiment of the present invention comprises a power load information reception unit 11, power load information monitor unit 12, data storage unit 13, packet generation unit 14, and packet transmission unit 15.

The power load information reception unit 11 receives power load information from the power company 1. Note that the power load information pertains to the load on electric power supplied from the power company.

The power load information monitor unit 12 monitors the load information received by the power load information reception unit 11. More specifically, the power load information monitor unit 12 determines whether or not the received load information exceeds a first or second threshold value 13a or 13b stored in the data storage unit 13.

Figure 6:
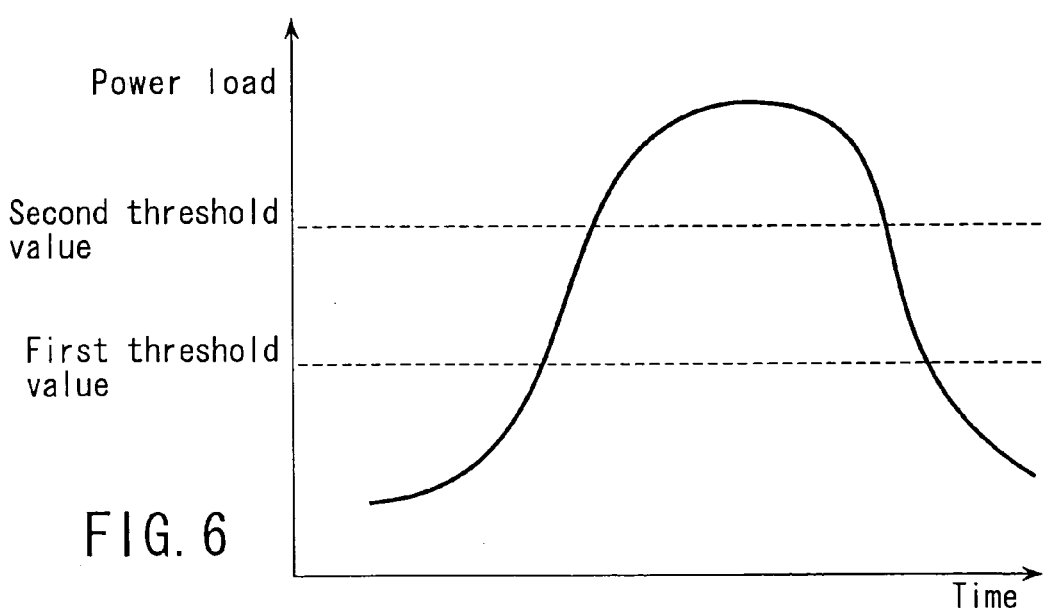
FIG. 6 is a graph showing the relationship between the power load and threshold values.
Figures 7, 8:
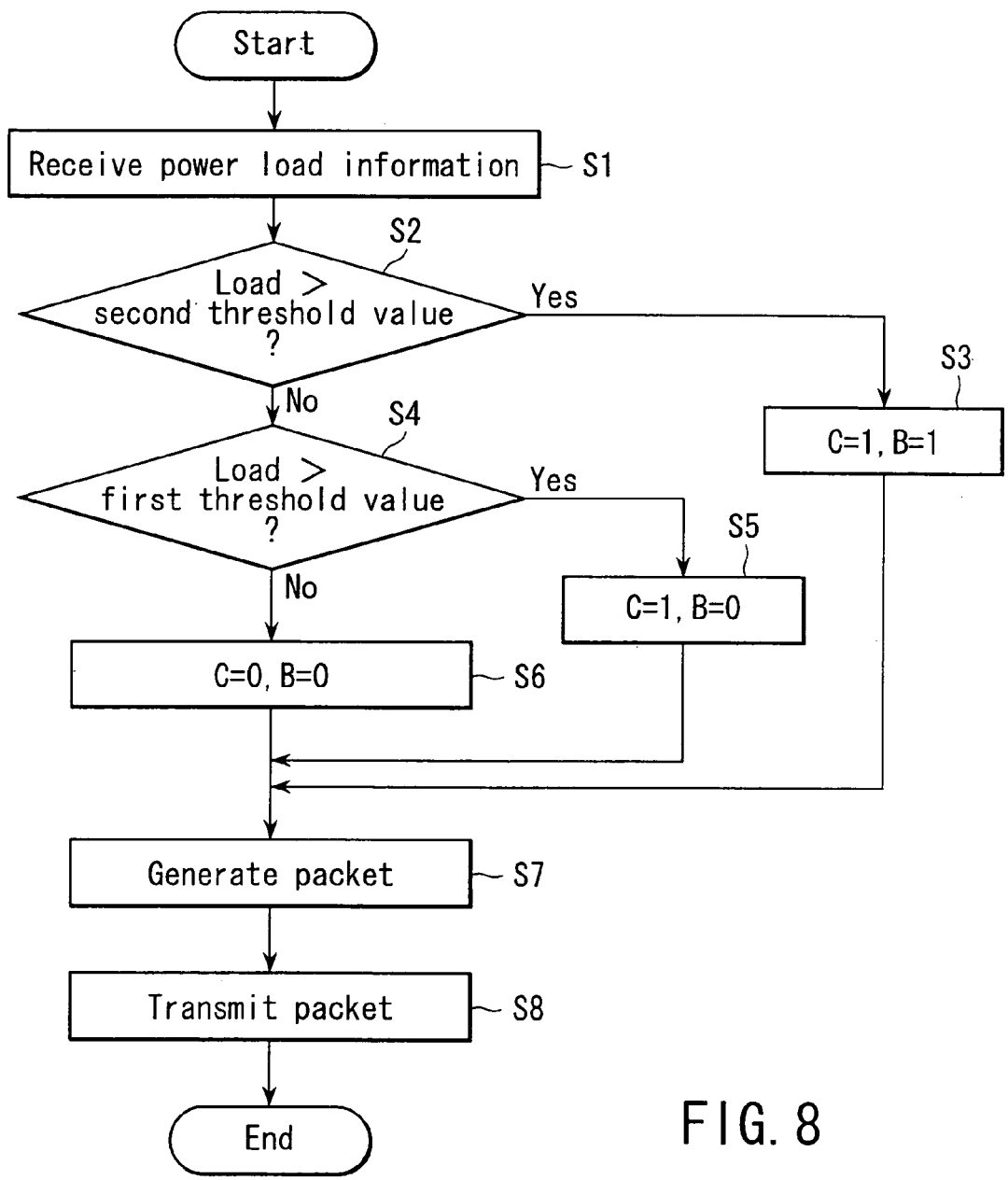
FIG. 7 is a table showing the relationship between the threshold values and power supplies.
FIG. 8 is a flow chart for explaining the operation of a server.

FIG. 6 is a graph showing the relationship between the power load and threshold values. FIG. 7 is a table showing the relationship between the threshold values and power supplies. As shown in FIG. 7, when the power load is higher than the first threshold value and is equal to or lower than the second threshold value, the battery of each client computer is inhibited from being charged, and use of an external power supply (AC adapter) is permitted. When the power load is equal to or higher than the second threshold value, the battery of each client computer is inhibited from being charged, and use of an external power supply (AC adapter) is also inhibited.

Figure 3:
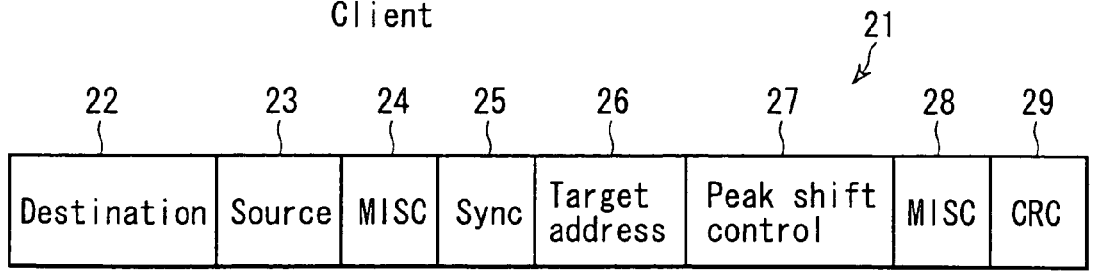
FIG. 3 shows a packet generated by a packet generation unit.

The packet generation unit 14 generates a packet to be transmitted to each client computer on the basis of the information monitored by the power load information monitor unit 12. FIG. 3 shows a packet generated by the packet generation unit 14.

The embodiment of the present invention uses a packet similar to so-called Magic Packet® (see AMD, Inc. Publication# 20213: "Magic Packet Technology", incorporated herein by reference) that can implement WOL (Wake-on-LAN).

As shown in FIG. 3, this packet comprises a destination field 22, source field 23, MISC field 24, Sync field 25, target address field 26, peak shift control field 27, MISC field 28, and CRC field 29.

The destination field 22 stores information indicating the destination of the packet.

The source field 23 stores information indicating the source of the packet.

Each of the MISC fields 24 and 28 stores information indicating an arbitrary pattern having an arbitrary length.

The Sync field 25 stores 1-byte data "FA" that follows 5 bytes or more of data "FF", and has a 2-bit difference from the SYNC field of Magic Packet, which stores 6 bytes of "FF".

The target address field 26 stores 15 pieces of identical information each indicating the MAC address of a client computer which is to undergo peak shift control.

The peak shift control field 27 is unique to the power management system according to the first embodiment of the present invention, and details thereof will be explained later.

The CRC field 29 is a general field for error detection control of the packet.

Information stored in the peak shift control field 27 will be described below.

Figure 4:
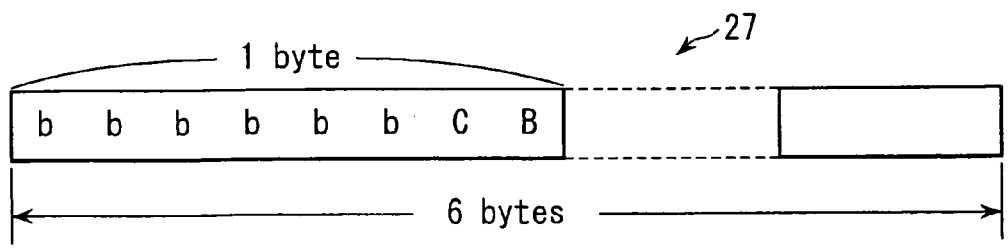
FIG. 4 shows a peak shift control field according to the first embodiment of the present invention.

FIG. 4 shows the peak shift control field 27 according to the first embodiment of the present invention.

As shown in FIG. 4, the peak shift control field 27 consists of 6 bytes, and FIG. 4 shows the contents of the first byte. Note that data of the first byte are repetitively set in the second to sixth bytes as needed, and the first bit of an insignificant byte is set to "0".

Referring to FIG. 4, "b" indicates an undefined bit, bit "C" indicates information associated with charging of the battery, and bit "B" is information indicating a power supply destination. When "C"=1, charging of the battery is inhibited in principle; when "C"=0, inhibition of charging of the battery is canceled. When "B"=1, electric power from the battery is preferentially used; when "B"=0, electric power from the external power supply (AC adapter) is preferentially used.

In this embodiment, every time the state of a client computer which is to undergo peak shift control is changed, the server transmits the above packet to the client computer. Alternatively, the packet may be transmitted at predetermined time intervals.

Figure 5:
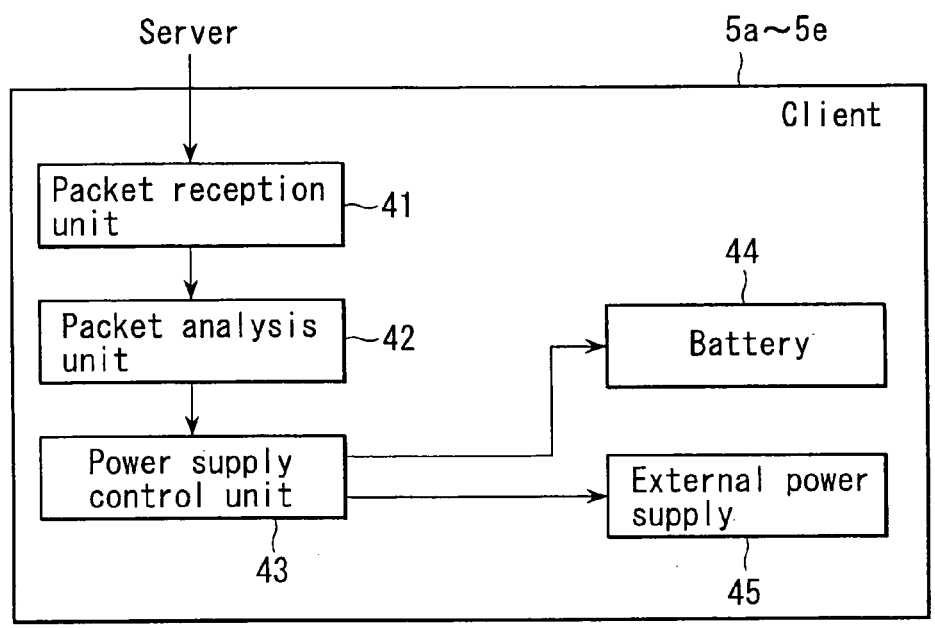
FIG. 5 is a block diagram showing the arrangement of client computers.

FIG. 5 shows the arrangement of the client computers 5a to 5e.

As shown in FIG. 5, each of the client computers 5a to 5e comprises a packet reception unit 41, packet analysis unit 42, power supply control unit 43, battery 44, and external power supply circuit 45 (serving as an external power supply input portion). While a battery is indicated at element 44, it is understood that embodiments of the invention more generally include any second power source such as a fuel cell. The second power source is preferably portable and is generally located within the computer 5a–5e. However, a large externally located secondary power source (i.e., battery) may be used to service a plurality of computers.

The packet reception unit 41 receives a packet 21 which is sent from the server and contains information associated with power supply control.

The packet analysis unit 42 analyzes information associated with power supply control, which is contained in the packet 21 received by the packet reception unit 41. More specifically, the unit 42 analyzes information associated with charging of the battery and information indicating the power supply destination, which are contained in the first byte of the peak shift control field 27 in the packet 21, and informs the power supply control unit 43 of the analysis result.

The power supply control unit 43 controls the battery and external power supply circuit on the basis of the analysis result of the packet analysis unit 42. More specifically, when bit "C" (in the peak shift control field 27 contained in the packet 21)=1, charging of the battery is inhibited; when "C"=0, inhibition of charging of the battery is canceled. When "B"=1, electric power from the battery 44 is preferentially used; when "B"=0, electric power from the external power supply (AC adapter) 45 is preferentially used.

The operation of the power management system according to the first embodiment of the present invention will be described below with reference to the flow charts in FIGS. 8 and 9.

FIG. 8 is a flow chart for explaining the operation of the server.

Upon reception of the power load information from the power company (S1), the power user corporation management server checks based on the received power load information if the power load is larger than the predetermined second threshold value shown in FIG. 6 (S2). If it is determined in S2 that the power load is larger than the second threshold value, bits "C"=1 and "B"=1 in a power management field contained in a packet are determined (S3).

On the other hand, if it is determined in S2 that the power load is smaller than the second threshold value, it is then checked if the power load is larger than the first threshold value shown in FIG. 6 (S4). If it is determined in S4 that the power load is larger than the first threshold value, bits "C"=1 and "B"=0 in a power management field contained in a packet are determined (S5).

On the other hand, if it is determined in S4 that the power load is smaller than the first threshold value, bits "C"=0 and "B"=0 in a power management field contained in a packet are determined (S6).

After that, a packet is generated (S7) in which information determined in S3, S5, or S6 is set in predetermined bits of the power management field, and the generated packet is transmitted to the client computer (S8).

Figure 9:
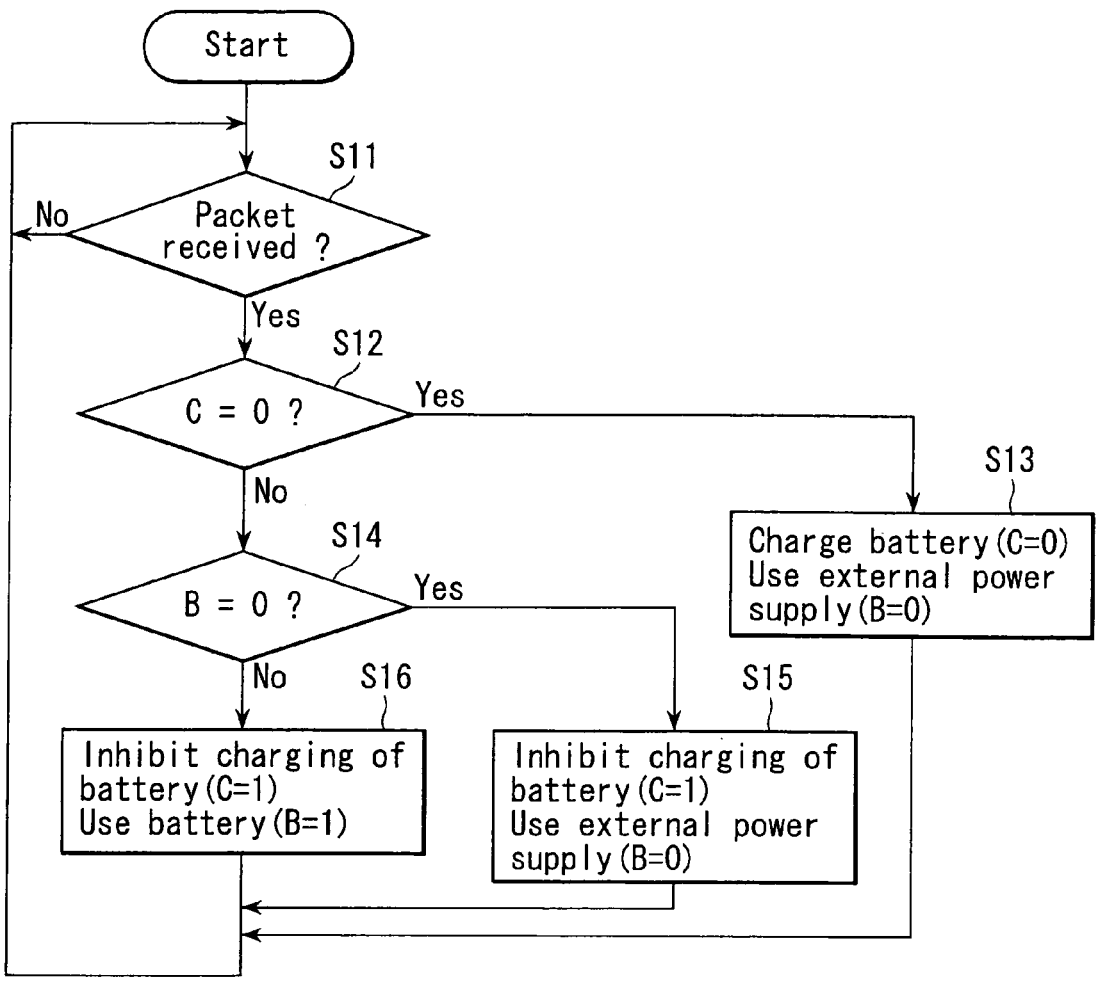
FIG. 9 is a flow chart for explaining the operation of a client computer.

FIG. 9 is a flow chart for explaining the operation of the client computer.

Upon reception of the packet transmitted from the server (S11), the client computer analyzes bits "C" and "B" contained in the peak shift control field 27 in that packet and checks if bit "C"=0 (S12).

If it is determined in S12 that bit "C"=0, the battery is charged. Also, it is determined that bit "B"=0, and the external power supply is used (S13). The reason why "B"=0 is determined is that a combination of "C"=0 and "B"=1 is not available.

On the other hand, if it is determined in S12 that bit "C"≠0, it is checked if "B"=0 (S14). If it is determined in S14 that "B"=0, charging of the battery is inhibited, and the external power supply is used as a power supply (S15). If it is determined in S14 that bit "B"≠0, charging of the battery is inhibited, and the battery is used as a power supply (S16).

Therefore, according to the power management system of the first embodiment of the present invention, the server transmits a packet for peak power shift control on the basis of the power load information transmitted from the power company. The client computer switches its power supply between the battery and external power supply on the basis of the received packet. Hence, adaptive peak power shift control can be implemented without limiting the functions of the client computer.

<Second Embodiment>

A power management system according to the second embodiment of the present invention will be described below.

The power management system according to the second embodiment of the present invention prepares a plurality of power supply control patterns in advance, acquires parameter information used to determine this power supply control pattern, and transmits information associated with a power supply from a server to a client computer on the basis of the power supply control pattern determined based on the parameter information.

Figure 10:
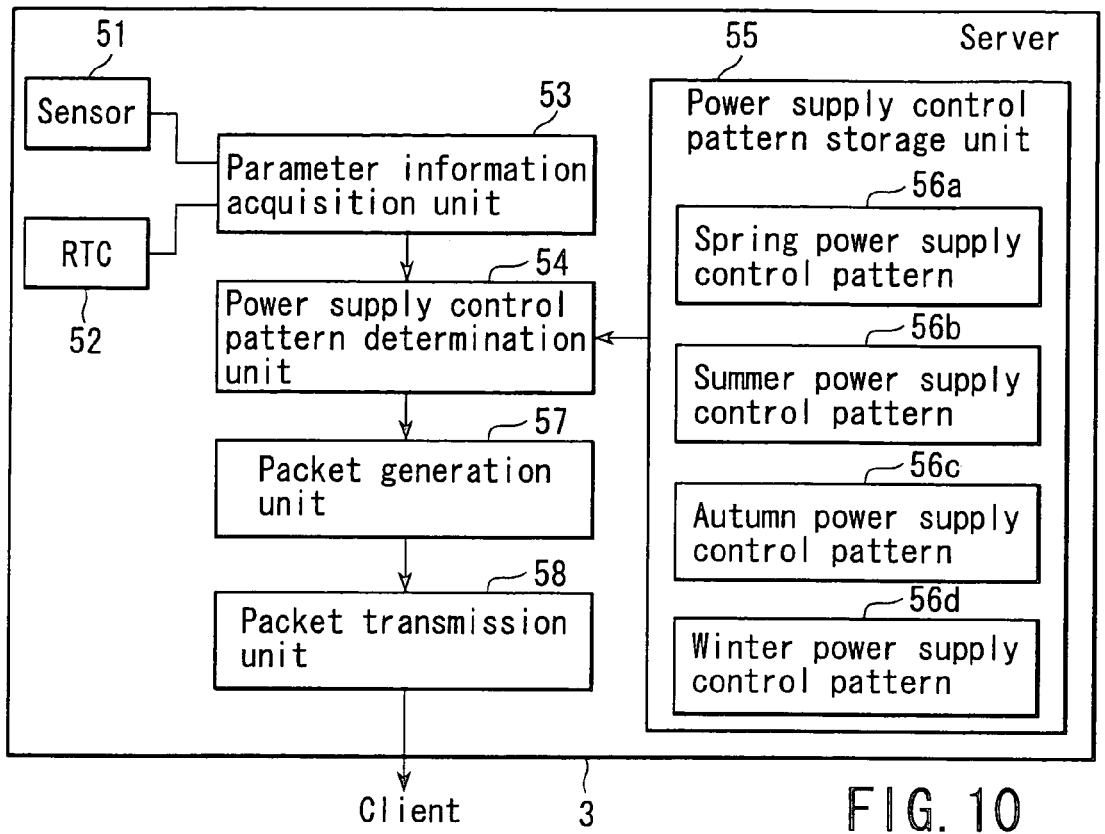
FIG. 10 is a block diagram showing a server of the power management system according to the first embodiment of the present invention.

FIG. 10 is a block diagram showing a server in the power management system according to the second embodiment of the present invention.

As shown in FIG. 10, a server 3 according to the second embodiment of the present invention comprises a sensor 51, RTC (Real Time Clock) 52, parameter information acquisition unit 53, power supply control pattern determination unit 54, power supply control pattern storage unit 55, packet generation unit 57, and packet transmission unit 58.

The parameter information acquisition unit 53 acquires parameter information used to determine a power supply control pattern. In this embodiment, the unit 53 acquires current ambient temperature information from the sensor 51 and date & time information from the RTC 52.

The power supply control pattern determination unit 54 determines one of a plurality of power supply control patterns stored in the power supply control pattern storage unit 55 on the basis of the parameter information acquired by the parameter information acquisition unit 53.

The power supply control pattern storage unit 55 stores a spring power supply control pattern 56a, summer power supply control pattern 56b, autumn power supply control pattern 56c, and winter power supply control pattern 56d.

Note that the power supply control patterns for respective seasons are stored in this embodiment. However, the present invention is not limited to such specific patterns. For example, various other patterns such as patterns for respective days of the week, those for respective temperatures, and the like may be used. It is also possible to use a combination of one or more of (1) time/date information (2) day of week information; and (3) temperature information to store pattern data. As an example, the seasonal data for summer, fall, winter and spring may be overridden by an ambient temperature range so that if a fall day is particularly hot, the current ambient temperature parameter will modify the normal fall setting to compensate for the unusually hot weather. However, the time interval for such an power saving adjustment may be less than the time used for a normal hot weather pattern that would be appropriate for a summer setting. Of course, weekend days are treated in consideration of a reduced power demand than normal workdays.

In this embodiment, the power supply control pattern determination unit 54 determines a power supply control pattern on the basis of the date & time information from the RTC 52 acquired by the parameter information acquisition unit 53 since the power supply control patterns stored in the power supply control pattern storage unit 55 are determined in correspondence with respective seasons.

The power supply control pattern determination unit 54 acquires information associated with power supply control of a day from the determined power supply control pattern. More specifically, the unit 54 acquires information indicating the times at which the first and second threshold values described in the first embodiment are expected to be reached, and information indicating charging of the battery and the power supply destination from the determined power supply control pattern.

Figure 11:
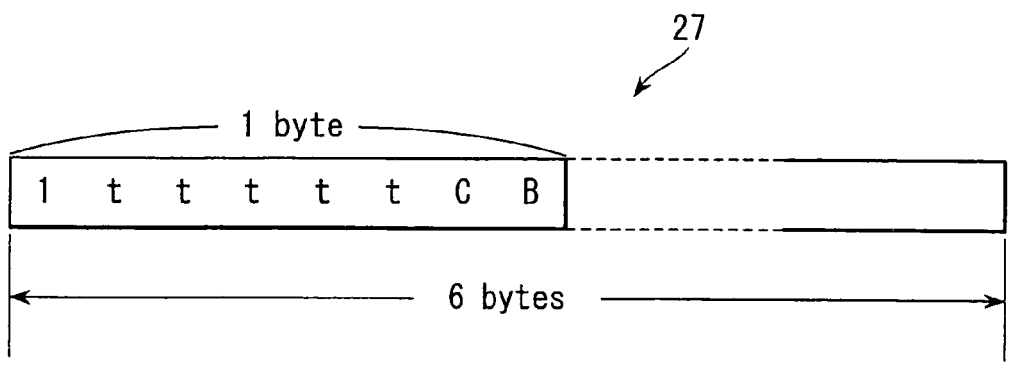
FIG. 11 shows a peak shift control field in a packet used in a power management system according to the second embodiment of the present invention.

FIG. 11 shows a peak shift control field 27 in a packet used in the power management system according to the second embodiment of the present invention.

As shown in FIG. 11, the peak shift control field 27 consists of 6 bytes, and FIG. 11 shows the contents of the first byte. Note that data of the first byte are repetitively set in the second to sixth bytes as needed, and the first bit of an insignificant byte is set to "0".

In FIG. 11, the first bit "1" indicates that this byte is a significant byte. Bit "t" stores information indicating time information, and the control shifts to a state defined by bits "C" and "B" at the time indicated by bit "t".

Bit "C" indicates information associated with charging of a battery, and bit "B" is information indicating a power supply destination. When "C"=1, charging of the battery is inhibited; when "C"=0, inhibition of charging of the battery is canceled. When "B"=1, electric power from the battery is preferentially used; when "B"=0, electric power from the external power supply (AC adapter) is preferentially used.

In this embodiment, every time the state of a client computer which is to undergo peak shift control is changed, the server transmits the above packet to the client computer. Alternatively, the packet may be transmitted at predetermined time intervals, or information for a day may be sent at the same time.

The packet generation unit 57 generates a packet to be transmitted to a client computer on the basis of the information obtained by the power supply control pattern determination unit 54.

The packet transmission unit 58 transmits the packet generated by the packet generation unit 57 to a client.

Figure 12:
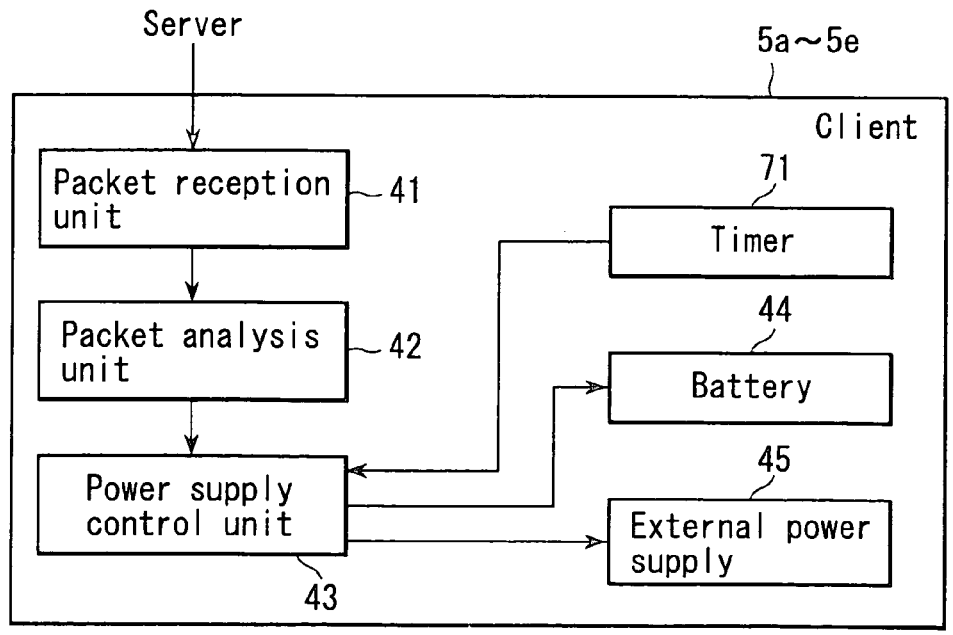
FIG. 12 is a block diagram showing the arrangement of client computers.

FIG. 12 shows the arrangement of client computers 5a to 5e.

As shown in FIG. 12, each of the client computers 5a to 5e comprises a packet reception unit 41, packet analysis unit 42, power supply control unit 43, battery 44, external power supply circuit 45, and timer 71.

The packet reception unit 41 receives a packet 21 which is sent from the server and contains information associated with power supply control.

The packet analysis unit 42 analyzes information associated with power supply control, which is contained in the packet 21 received by the packet reception unit 41. More specifically, the unit 42 analyzes information associated with charging of the battery, information indicating the power supply destination, and information indicating the time at which control associated with charging of the battery and supply of the power supply is to be started, which are contained in the first byte of the peak shift control field 27 in the packet 21, and informs the power supply control unit 43 of the analysis result.

The power supply control unit 43 controls the battery and external power supply circuit at the predetermined time on the basis of the analysis result of the packet analysis unit 42. More specifically, when bit "C" (in the peak shift control field 27 contained in the packet 21)=1, charging of the battery is inhibited at the time indicated by the time information; when "C"=0, inhibition of charging of the battery is canceled at the time indicated by the time information.

When "B"=1, electric power from the battery 44 is preferentially used at the time indicated by the time information; when "B"=0, electric power from the external power supply circuit (AC adapter) 45 is preferentially used at the time indicated by the time information. Whether or not the time is reached is determined by the power supply control unit 43 with reference to the value of the timer 71.

The operation of the power management system according to the second embodiment of the present invention will be described below with reference to the flow charts in FIGS. 13 and 14.

Initially, parameter information used to determine a power supply control pattern is acquired in the server 3 (S31). In this embodiment, since the power supply control pattern storage unit 55 stores the spring, summer, autumn, and winter power supply control patterns 56a, 56b, 56c, and 56d, date & time information required to determine one of these patterns is acquired from the RTC 52 as a parameter. When power supply control patterns are set in correspondence with temperatures, temperature information from the sensor 51 is acquired as a parameter.

A power supply control pattern is determined on the basis of the parameter information acquired in S31 (S32). For example, if the date & time information as the parameter information indicates "○:×, Aug. 15, 2002", the summer power supply control pattern 56b is selected; if the date & time information as the parameter information indicates "○:×, Dec. 15, 2002", the winter power supply control pattern 56d is selected.

After that, information associated with the control time and use of a power supply is acquired from the power supply control pattern determined in S32 (S33). More specifically, information indicating the times at which the first and second threshold values described in the first embodiment are assumed to be reached, and information indicating charging of the battery and the power supply destination are acquired from the determined power supply control pattern.

A packet is generated by setting the information acquired in S33 in the peak shift control field 27 shown in FIG. 11 (S34), and the generated packet is transmitted to the client computer (S35).

Figure 13:
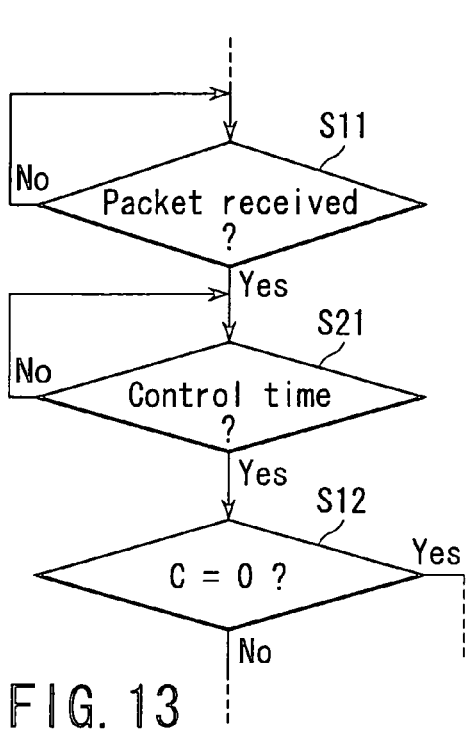
FIG. 13 is a flow chart for explaining the operation of the power management system of the second embodiment.
Figure 14:
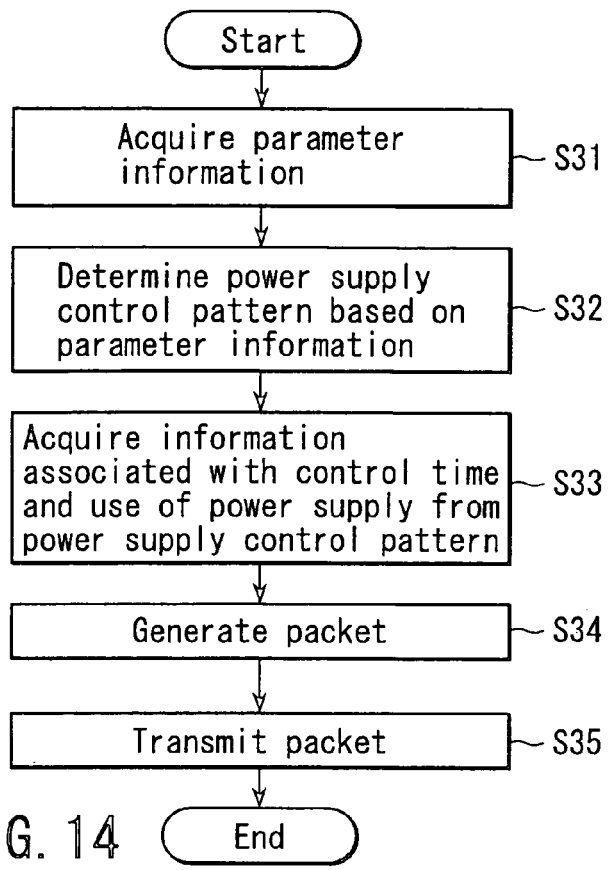
FIG. 14 is a flow chart for explaining the operation of the power management system of the second embodiment.

FIG. 13 is a flow chart for explaining the operation of the client computer. The operation of the client computer according to the second embodiment of the present invention is basically the same as that in the flow chart shown in FIG. 9, except that the step (S21) of determining whether or not the control time is reached is executed between S11 and S12.

That is, in this embodiment, since the peak shift control field 27 in the packet sent from the server contains information associated with the execution time of control of the power supply and charging, the client computer refers to the information associated with the time, and starts execution of the power supply control when the time indicated by that information associated with the time is reached.

Therefore, according to the second embodiment of the present invention, parameter information is acquired, a power supply control pattern is determined based on the acquired parameter information, and charging of the battery and a power supply to be used of the client computer are controlled in accordance with the determined power supply control pattern. Therefore, adaptive peak power shift control can be implemented without limiting the functions of the client computer.

Since the packet contains time information, information associated with peak shift control for a day can be simultaneously transmitted to the client computer.

<Third Embodiment>

A power management system according to the third embodiment of the present invention will be described below.

The power management system according to the third embodiment of the present invention controls power supplies for respective client computer groups in a peak power shift time band, thereby leveling peak power.

Figure 15:
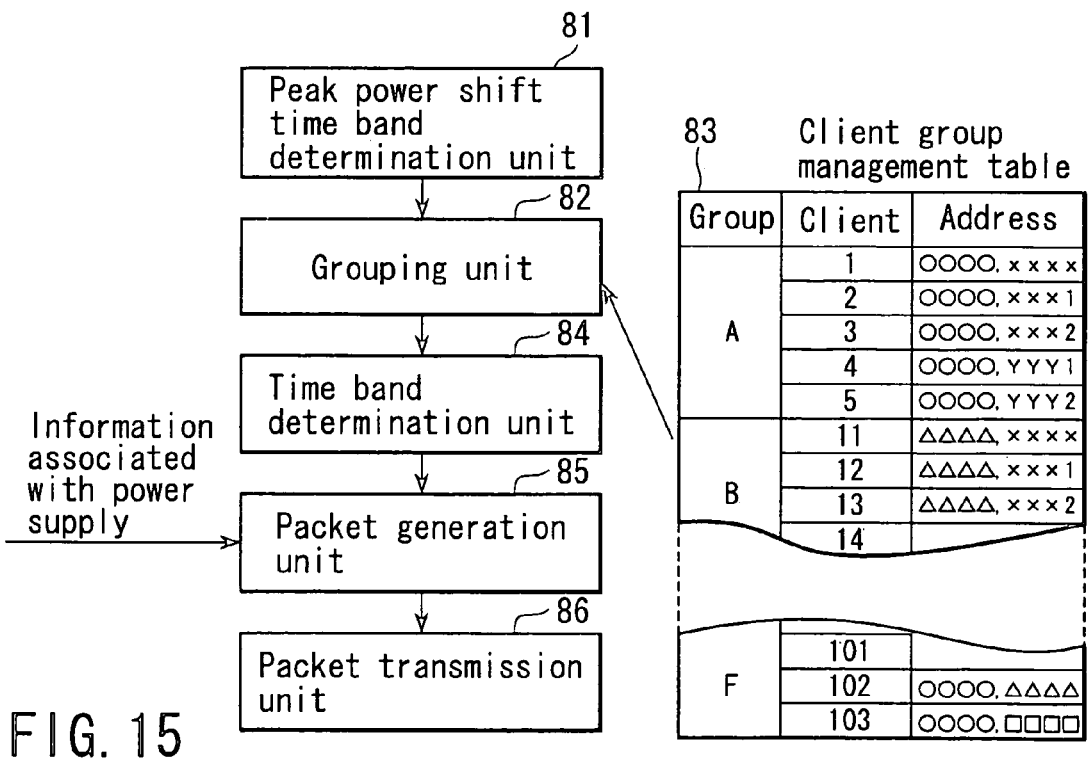
FIG. 15 is a block diagram showing the arrangement of a server in a power management system according to the third embodiment of the present invention.

FIG. 15 is a block diagram showing the arrangement of a server in the power management system according to the third embodiment of the present invention.

As shown in FIG. 15, the server according to the third embodiment of the present invention comprises a peak power shift time band determination unit 81, grouping unit 82, client group management table 83, time band determination unit 84, packet generation unit 85, and packet transmission unit 86.

The power shift time band determination unit 81 determines a time band in which peak power shift control is to be made. This peak power shift time band can be predicted on the basis of power load information sent from the power company in the first embodiment, or can be obtained from the power supply control pattern in the second embodiment. In this embodiment, a method of obtaining the peak power shift time band is not particularly limited.

The grouping unit 82 determines client groups which are to undergo peak power shift control on the basis of the client group management table 83. The client group management table 83 manages clients to be controlled and their addresses for respective groups.

In this embodiment, as an example of grouping, the client group management table 83 is referred to. However, various other grouping methods may be used. For example, the server reads the hardware serial numbers of client computers, and executes peak power shift control in the former or latter half of the peak shift time band depending on whether the hardware serial number is an even or odd number.

Since the method of reading the hardware serial number of a client computer is the state-of-the-art technique, and is known as DMI (Desk Top Management Interface), a description thereof will be omitted. Note that this method of reading the hardware serial number of a client computer is preferably implemented as an application (utility) software for peak power shift control. Of course, this method can be implemented as firmware of a BIOS (Basic Input Output System) or EC (Embedded controller).

The time band determination unit 84 assigns the peak power shift time periods determined by the peak power shift time band determination unit 81 to respective groups.

Figure 16:
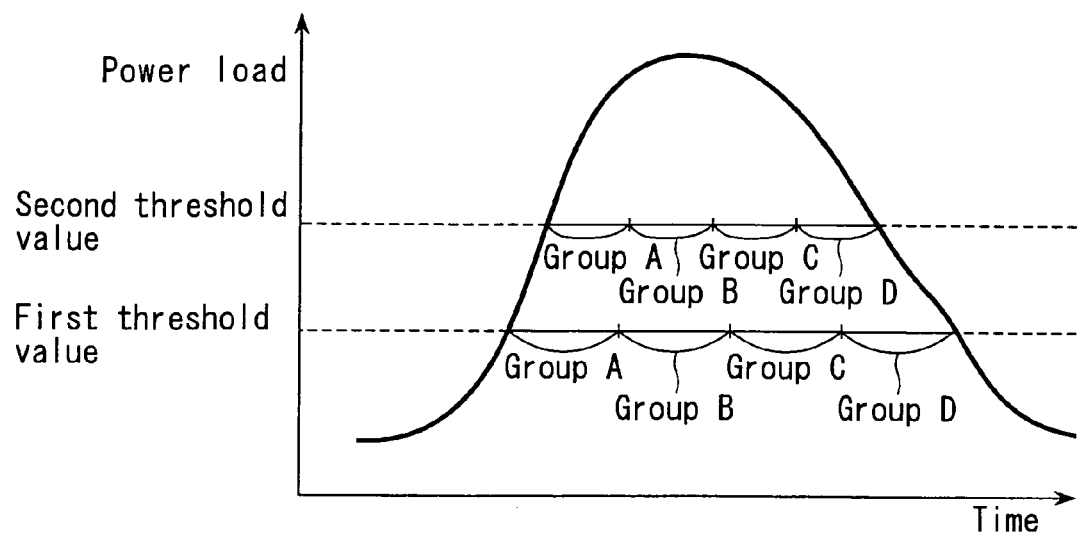
FIG. 16 is a graph showing an example of grouping.

FIG. 16 shows an example of grouping. FIG. 16 exemplifies a case wherein the peak power shift time band is divided for groups A to D. In the example of FIG. 16, peak power shift time periods are equally assigned to the respective groups during the peak power shift time band.

For example, "13:00 to 14:30" for group A, "14:30 to 16:00" for group B, and so forth are set.

Figure 17:
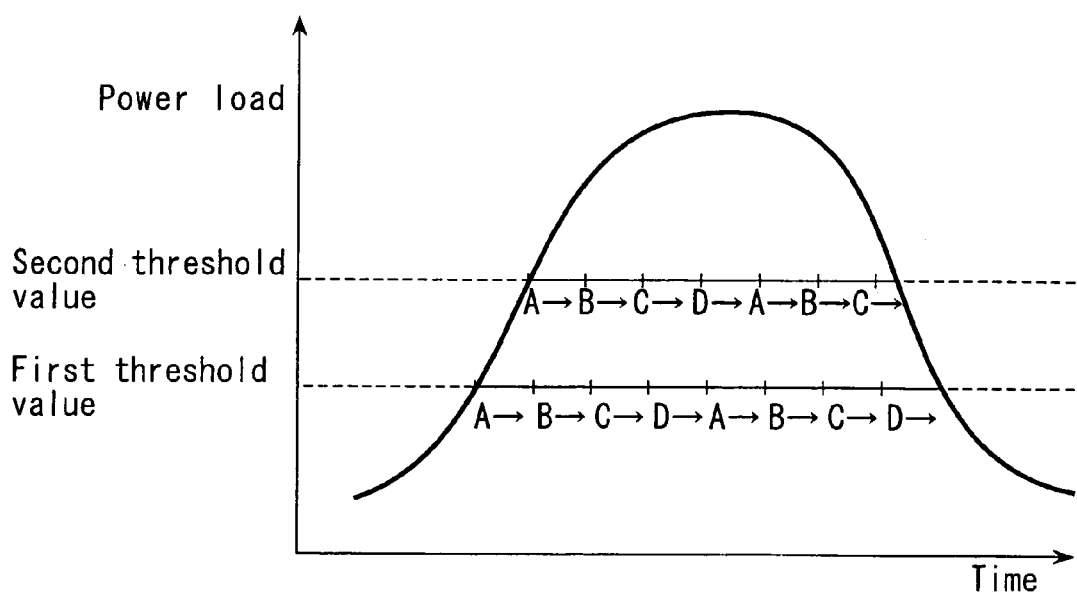
FIG. 17 is a graph showing another example of grouping.

FIG. 17 shows another example of grouping. In this example, the peak power shift time band is divided into given time periods (e.g., 1 hour), and the divided peak power shift time periods are assigned to the respective groups.

The packet generation unit 85 generates a packet by embedding information associated with a power supply and information associated with the peak power shift time band determined by the time band determination unit 84 in the peak power shift control field 27 in the packet shown in FIG. 3 for each group. Note that the information associated with a power supply means information associated with charging of a battery and use of a power supply described in the first and second embodiments.

The packet transmission unit 86 transmits the packet generated by the packet generation unit 85 to the client computers of the corresponding group.

FIG. 18 is a flow chart for explaining the operation of a power user corporation management server in the power management system according to the third embodiment of the present invention.

Initially, the server determines a peak power shift time band (S51), and determines groups of client computers (S52). The determination of peak power may be made with reference to a power load signal supplied from the power company (as in the first described embodiment) or may be made by reference to a stored pattern based on time of day/year and/or temperature data (as in the second described embodiment). Then, the server determines peak power shift time periods of respective groups determined in S52 in the peak power shift time band determined in S51 (S53).

After that, the server generates a packet set with information indicating the peak power shift time period determined in S53 and information associated with a power supply for each group (S54). The packet generated in S54 is transmitted to the corresponding group (S55).

Therefore, according to the power management system of the third embodiment of the present invention, since the peak power shift time band is divisionally assigned to a plurality of groups, an abrupt change in peak power can be avoided. As a result, safety of the power system can be assured.

A modification of the above embodiment will be described below.

In the above description, client computers included in a given group simultaneously undergo power supply control. This modification will exemplify a case wherein client computers included in the group do not simultaneously undergo power supply control.

In such case, each of the client computers has a unique delay time period, and starts power supply control from a time obtained by adding the unique delay time period to the power supply control time contained in the packet sent from the server. In this way, the client computers even in a single group can be prevented from simultaneously undergoing power supply control.

FIG. 19 is a flow chart for explaining the process of such clients. This flow chart is basically the same as those shown in FIGS. 9 and 13, except that a process in S61 is added after the process in S11.

That is, in S61, a time obtained by adding the unique delay time period to a time indicated by information associated with the execution time of control of a power supply and charging, which is contained in the packet, is determined as a control time. In this way, client computers in a given group can start power supply control at individual times, thus preventing an abrupt change in power load.

FIG. 20 is a chart for explaining the execution timings of power supply control of client computers included in a single group. FIG. 10 shows a case under the condition that client A has a delay time period of 0 min; client B, 10 min; client C, 20 min; and client D, 30 min.

In the modification of the embodiment, client computers included in a given group undergo peak power shift control. However, each individual client server executes peak power shift control without grouping.

In this case, for example, when the peak power shift time period of respective client computers is 2 hours, if the start times are uniformly distributed and assigned from noon to 2 p.m., the peak shift effect gradually increases from noon to 2 p.m., and gradually decreases after 2 p.m. At 4 p.m., the peak shift effect becomes zero. In this case, if each client computer cancels inhibition of battery charging 2 hours after the end time of its peak power shift control, a power demand for changing gradually increases after 4 p.m.

In the first to third embodiments, when the control time is reached, the power supply control is executed. Thus, there is a central management of the power load as controlled by the server. However, some users may not want to switch power supply control.

Figure 21:
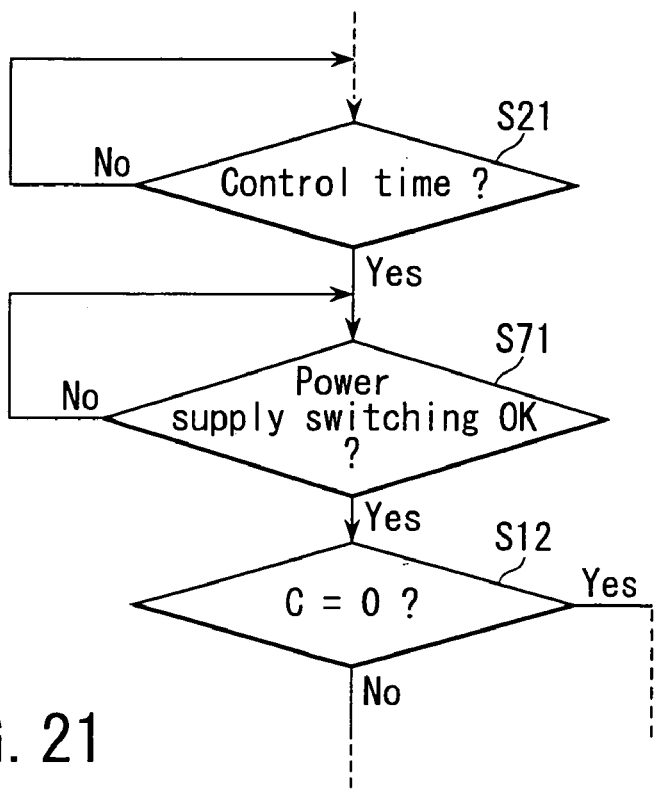
FIG. 21 is a flow chart for explaining the process of a client computer.
Figure 22:
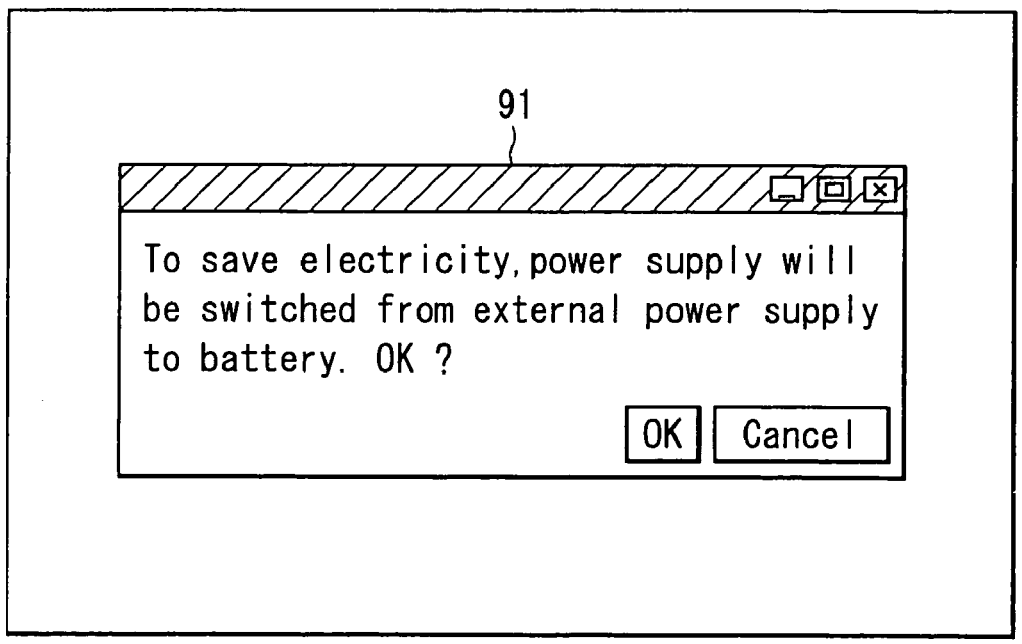
FIG. 22 shows an example of a user interface window used to confirm such switching of power supply control.

In such case, step 71 of confirming if power supply control is to be switched is inserted in the client computer process, as shown in FIG. 21, and only when permission is granted, the subsequent process may be executed. FIG. 22 shows an example of a user interface window 91 used to confirm such switching of power supply control.

Therefore, in the embodiment of the present invention, upon executing the peak power shift control, since power shift control is distributed and executed for respective groups or client computers, an abrupt change in peak power load can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power management system comprising:
    a server connected to a first network; and
    a plurality of client computers connected to the server via a second network,
    wherein the server comprises:
        means for defining groups among the plurality of client computers;
        means for determining a power shift time period for each of the client computer groups based on power load information for an external power source sent by a power company;
        means for determining power source information for each of the client computer groups, the power source information including first information representing which of the external power source and a secondary power source is to be used by the group of client computers, and second information representing the power shift time period for the group of client computers; and
        means for transmitting power source information to each of the client computer groups, and
    wherein each of the plurality of client computers comprises:
        means for receiving power source information transmitted from the server;
        means for selecting one of the external power source and the secondary power source based on received first information; and
        means for determining a time for using the selected one of the external power source and the secondary power source based on received second information,
        wherein the means for selecting controls supply of power from the external power source or the secondary power source based on the determined time.

2. A power management system according to claim 1, wherein the server is connected to the power company via the first network and the power load information is sent from the power company.

3. A power supply control method in a power management system which comprises a server connected to a first network and a plurality of client computers connected to the server via a second network, the method comprising:
    the server defining groups among the plurality of client computers;
    the server determining a power shift time period for each of the client computer groups based on power load information for an external power source sent by a power company;
    the server determining power source information for each of the client computer groups, the power source information including first information representing which of the external power source and a secondary power source is to be used by the group of client computers, and second information representing the power shift time period for the group of client computers;
    the server transmitting the power source information to each of the client computer groups;
    each of the client computers receiving power source information transmitted from the server;
    each of the client computers selecting one of the external power source and a secondary power source based on the received first information; and
    each of the client computers determining a time for using the selected one of the external power source and the secondary power source based on the received second information; and
    each of the client computers controlling supply of power from the external power source or the secondary power source based on the determined time.

4. A server used in a power management system, comprising:
    means for defining groups among a plurality of client computers;
    means for determining a power shift time period for each of the client computer groups based on power load information for an external power source sent by a power company;
    means for determining power source information for each of the client computer groups, the power source information including first information representing which of the external power source and a secondary power source is to be used by the group of client computers, and second information representing the power shift time period for the group of client computers; and
    means for transmitting power source information to each of the client computer groups.

* * * * *